Inventor:
Roy Starmer

United States Patent Office 3,461,039
Patented Aug. 12, 1969

3,461,039
PLURAL CONDENSER EVAPORATOR
Roy Starmer, Peterlee, England, assignor to Applied Research and Engineering Limited, Peterlee, England, a British company
Filed Jan. 19, 1966, Ser. No. 521,679
Claims priority, application Great Britain, Jan. 29, 1965, 4,095/65
Int. Cl. B01d *3/06;* C02b *1/06*
U.S. Cl. 202—186                                                            2 Claims

ABSTRACT OF THE DISCLOSURE

An evaporator for a distillation plant consisting of at least one flash evaporation chamber, a first moisture separator, first condensing means, a first condensate receiver arranged to collect condensate from the first condensing means, means to guide vapour from the evaporation chamber through the first separator to the first condensing means, a second condensing means, a second condensate receiver arranged to collect condensate from the second condensing means, and means to guide vapour which is not condensed by and passes through the first condensing means to the second condensing means, the arrangement being such that vapour which is not condensed by the first condensing means is scrubbed by condensate from the first condensing means as the vapour passes through the first condensing means.

---

Figure 1:
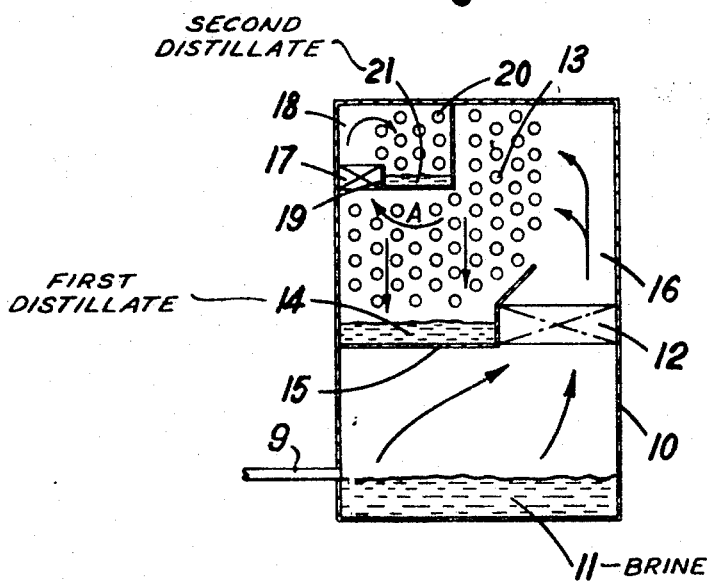

This invention relates to evaporators and in particular, though not solely, to the evaporators of distillation plants used for the production of a potable water supply from sea water or brine.

In a sea water distillation plant, an alternative high purity water output is often required to provide feed or feed makeup to the boilers normally associated with such distillation plants. It is unusual for the bulk water made by the evaporator to be sufficient quality to be tapped direct for this purpose so that often supplementary arrangements for further treatment are included in the evaporator for this purpose, for example, a second stage distillation section whereby the distillate is redistilled, or an evaporator which has an especially large stage or stages with extra efficient separators so as to get a proportion of the distillate made at a better than average purity.

It is an object of the invention to increase the degree of purity of part of the production of the evaporator without any redistilling being necessary or without any increase in the size of flash chambers or condensing service, which distillate, if of sufficient high purity, may then be used as the feed or as a make-up feed for the boiler of the distillation plant.

According to the invention, an evaporator of a distilling plant comprises one or more evaporation chambers into which may be fed the fluid to be distilled and, in respect of each chamber, a condensing surface or surfaces for condensing part of the vapour discharged by the said fluid in that chamber characterised in that, for the or at least one of the chambers, the condensing surface or surfaces are divided into a first part and a second part which parts are located so that a portion only of the discharged vapour will first condense on the said first part to produce a first quantity of distillate, the remainder of the vapour being scrubbed by the first distillate and then being fed to the said second part for the production of a second quantity of distillate by means of the said scrubbing, which second quantity of distillate is purer than the said first quantity of distillate.

It is preferred that the evaporator is a flash evaporator.

It is also preferred that the said condensing surface or surfaces comprise a bundle of condensing tubes.

It is further preferred that the first part of the condensing surface or surfaces is of greater surface area than the said second part.

The discharged vapour is preferably passed through a moisture separator before part of it is condensed on the said first part of the condensing surface or surfaces. Where a particularly high degree of purity is required the portion of the vapour to be condensed on the said second part of the condensing surface or surfaces may also be passed through a moisture separator before it is so condensed, the latter moisture separator being located in the flow path of the vapour portion between the two parts of the condensing surface or surfaces.

The invention also provides a method of producing a purer distillate by means of the evaporator as aforesaid in which part only of the vapour discharged is condensed to form a first quantity of distillate, the excess vapour being washed by this distillate and directed from the first part of the condensing surface to the second part where it is condensed to produce a second quantity of distillate which is purer than the said first quantity of distillate.

Figure 2:
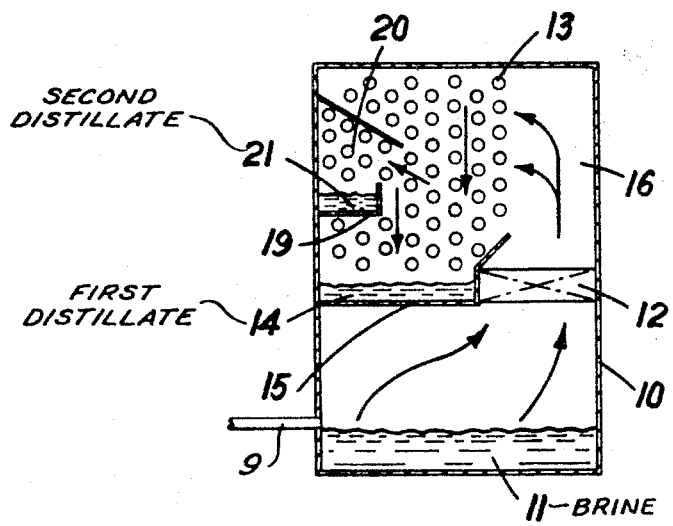

By way of example, two forms of evaporator in accordance with the invention will now be described with reference to the accompanying diagrammatic drawings in which:

FIGURE 1 shows a first form of evaporator, and
FIGURE 2 shows a second form of evaporator, both figures representing one chamber only of the evaporator.

With reference to FIGURE 1, the evaporator is a flash evaporator having a plurality of chambers of which one only is diagrammatically shown in the figure. In this example, boiling brine 11 is fed through a feed line 9 into a container 10. The vapour discharged by the brine 11 then passes through a moisture separator 12 to remove as many of the saltwater droplets as possible into a further container 16 in which there are a bundle of condenser tubes 13 to condense the vapour hence producing a first quantity of distillate 14 which is collected in a bath or container 15. However, the surface area of the condenser tubes 13 is not sufficient to condense all the vapour discharged into the container 16 thus leaving a quantity of excess vapour. This excess vapour is passed (in the direction shown by arrow A) through a second moisture separator 17 into a further container 18 in which there are further condenser tubes 20 to condense the said excess vapour to produce a second quantity of distillate 21 which is collected in a bath or container 19 and which is purer than the first quantity of distillate 14.

This fact may be appreciated from the following example in which it is assumed that the salt or dissolved solid content of the boiling brine 11 is 50,000 parts/million. The part of the plant containing the containers 10, 16 and the moisture separator 12 is not 100% effective and thus the distillate 14 will have some residual salt content, the value of which will depend on the size of plant. In this example, the salt content of distillate 14 will be taken as 50 parts/million which means that this part of the plant has a purification ratio of 1000.

Since the excess vapour not condensed on the surfaces of the condenser tubes 13 is still passed through the container 16, the vapour will be scrubbed by the droplets from the vapour which does condense, hence any droplets carried by the vapour will be droplets having a salt content of the distillate 14 and not of the brine 11.

These droplets are removed by the other part of the plant containing the container 18 and the second moisture separator 17. Assuming that the purification ratio of this other part of the plant is also 1000, the residual salt content of the second quantity of distillate 21 will be 0.050 part/million. However, in practice the said other part of the plant is unlikely to be as efficient as the first mentioned part of the plant and thus the salt content of the second quantity of distillate may be nearer 1 part/million.

Hence this second quantity of distillate is purer than the first quantity of distillate and may be used as feed or make-up feed for the boiler of the distillation plant if desired.

With reference to FIGURE 2, the construction of evaporator is substantially identical to that shown in FIGURE 1 except the second moisture separator 17 is omitted. This is permissable if a second distillate having a greater degree of residual salt content is permitted. However, even though the said separator 17 is omitted, the second quantity of distillate 21 is still purer than the first quantity of distillate 14.

Similarly, if desired, the first moisture separator 12 may be also omitted if a higher value of the residual salt content of the distillate is permitted. However, in any of the cases above described, the division of the area of condensing surfaces has been found to produce a second distillate having a lower residual salt content (i.e. purer) than the first distillate.

I claim:
1. An evaporator for a distillation plant consisting of:
  (a) at least one flash evaporation chamber,
  (b) a first moisture separator extending across a portion of the one flash evaporator chamber,
  (c) first condensing means overlying the flash evaporation chamber and to one side of the moisture separator.
  (d) a first condensate receiver arranged to collect condensate from the first condensing means extending across the remaining portion of the one flash evaporator chamber,
  (e) means to guide vapour from the evaporation chamber through the first separator to the condensing means,
  (f) a second moisture separator overlying at least a portion of the first receiver,
  (g) a second condensing means in a condensing chamber positioned at least above a portion of the first condensing means,
  (h) a second condensate receiver arranged alongside the second moisture separator to collect condensate from the second condensing means, and
  (i) means to guide vapour which is not condensed by and passes through the first condensing means through the second separator to the second condensing means, the arrangement being such that vapour which is not condensed by the first condensing means is scrubbed by condensate from the first condensing means as the vapour passes through the first condensing means.

2. An evaporator for a distillation plant consisting of:
  (a) at least one flash evaporation chamber,
  (b) a first moisture separator extending across a portion of the one flash evaporator chamber,
  (c) first condensing means overlying the flash evaporation chamber and to one side of the moisture separator,
  (d) a first condensate receiver arranged to collect condensate from the first condensing means extending across the remaining portion of the one flash evaporator chamber,
  (e) means to guide vapour from the evaporation chamber through the first separator to the first condensing means,
  (f) a second condensing means in a condensing chamber positioned at least above a portion of the first condensing means,
  (g) a second condensate receiver arranged adjacent a wall and above at least a portion of the first condensate receiver to collect condensate from the second condensing means, and
  (h) means to guide vapour which is not condensed by and passes through the first condensing means to the second condensing means, the arrangement being such that vapour which is not condensed by the first condensing means is scrubbed by condensate from the first condensing means as the vapour passes through the first condensing means.

References Cited
UNITED STATES PATENTS

| | | | |
|---|---|---|---|
| 2,617,758 | 11/1952 | Massiot | 203—87 |
| 2,662,850 | 12/1953 | Kraft | 202—186 |
| 3,096,256 | 7/1963 | Worthen et al. | 202—173 |
| 3,219,552 | 11/1965 | Starmer et al. | 202—173 |
| 3,308,839 | 3/1967 | Barday | 203—87 X |

NORMAN YUDKOFF, Primary Examiner

DAVID EDWARDS, Assistant Examiner

U.S. Cl. X.R.

202—197; 203—11